(12) United States Patent
Pohlenz et al.

(10) Patent No.: US 8,346,450 B2
(45) Date of Patent: Jan. 1, 2013

(54) METHOD AND DEVICE FOR CONTROLLING SLIP IN A TRACTOR VEHICLE OR THE LIKE

(75) Inventors: Jurgen Pohlenz, Ravensburg (DE); Gerhard Bailly, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 280 days.

(21) Appl. No.: 12/937,616

(22) PCT Filed: Mar. 23, 2009

(86) PCT No.: PCT/EP2009/053353
§ 371 (c)(1),
(2), (4) Date: Oct. 13, 2010

(87) PCT Pub. No.: WO2009/141181
PCT Pub. Date: Nov. 26, 2009

(65) Prior Publication Data
US 2011/0054750 A1    Mar. 3, 2011

(30) Foreign Application Priority Data

May 20, 2008  (DE) .......................... 10 2008 001 879

(51) Int. Cl.
*F16H 59/36* (2006.01)
(52) U.S. Cl. ................. 701/58; 701/61; 701/82; 701/87
(58) Field of Classification Search .................... 701/50, 701/58, 51, 54, 60, 61, 82, 87, 88; 180/197
See application file for complete search history.

(56) References Cited

U.S. PATENT DOCUMENTS

| | | | |
|---|---|---|---|
| 4,809,785 A | | 3/1989 | Arnold et al. |
| 6,909,959 B2* | | 6/2005 | Hallowell ......................... 701/88 |
| 7,302,333 B2 | | 11/2007 | Steen et al. |
| 2006/0080023 A1* | | 4/2006 | Hrovat et al. .................. 701/82 |
| 2008/0315559 A1 | | 12/2008 | Murakami et al. |
| 2009/0062065 A1 | | 3/2009 | Field et al. |

FOREIGN PATENT DOCUMENTS

| | | |
|---|---|---|
| DE | 102 19 270 C1 | 4/2003 |
| EP | 0 212 304 A2 | 4/1987 |
| EP | 1 857 714 A1 | 11/2007 |
| WO | 00/43695 A2 | 6/2000 |
| WO | 2004/098940 A1 | 11/2004 |
| WO | 2006/079662 A1 | 8/2006 |

OTHER PUBLICATIONS

Vahabzadeh H et al: "Split-Torque, Geared-Neutral Infinitely Variable Transmission Mechanism", International Automobile Technical Congress, May 7, 1990, pp. 687-695.

* cited by examiner

*Primary Examiner* — Richard M. Camby
(74) *Attorney, Agent, or Firm* — Davis & Bujold, PLLC

(57) ABSTRACT

A method and a device for controlling the slip of a tractor vehicle or the like, in which the drive wheel slip is determined and, if the actual slip is different from a specified nominal slip, the gear ratio of a controllable transmission in the drivetrain is adjusted in the direction of slip optimization. The transmission is a geared-neutral transmission whose output speed, at full drive power, can be adjusted to an extremely small value close to zero.

4 Claims, 1 Drawing Sheet

METHOD AND DEVICE FOR CONTROLLING SLIP IN A TRACTOR VEHICLE OR THE LIKE

This application is a National Stage completion of PCT/EP2009/053353 filed Mar. 23, 2009, which claims priority from German patent application serial no. 10 2008 001 879.1 filed May 20, 2008.

FIELD OF THE INVENTION

The invention concerns a method for controlling slippage of a tractor vehicle or the like, and a device for implementing the method.

BACKGROUND OF THE INVENTION

In this case the term "tractor vehicle or the like" is understood to mean a working vehicle in general, with which, during its operative use, high propulsion forces have to be produced by contact with the ground surface in order to generate a high thrust or traction force. As examples, agricultural tractors pulling a plow, or tractor shovels which push a loading shovel into a heap of material in order to take some of it up, may be mentioned. It is characteristic of such working processes that they take place at low driving speeds and are controlled by the driver via the control of the thrust. In known working vehicles the thrust is controlled, for example, by controlling the contact pressure in a slipping clutch, by specifying a speed difference in a hydraulic torque converter, or by means of some other torque-limiting element in the drivetrain, usually one that can be influenced by the driver.

The propulsion forces of the vehicle are produced by the contact of its tires with the ground. They depend on the normal force $F_n$ at each drive wheel and on the coefficients of friction $\mu$ between the tires and the ground. In this, the frictional coefficient $\mu$ is particularly responsible for the forces that can be transmitted between the tires and the ground. However, the frictional coefficient itself depends on the material pairing (tire/ground) in each case and also on the slippage taking place at the wheel, i.e. the ratio between the actual speed of the vehicle over the ground and the theoretical speed on the basis of the wheel rotation speed. The known $\mu$ slip curves show that the $\mu$ value at first rises steeply with increasing slip and reaches a maximum, and then falls again along a flatter course. From this it follows that some slip is necessary in order to produce a propulsion force. The result of the $\mu$ value decrease after the maximum is that the excess drive torque not transmitted to the ground gives rise to an increasing, undesired acceleration, i.e. to wheel spin, which leads to increased tire wear and/or to damage of the road.

A method for controlling slip and a device are known from DE 102 19 270 C1. They are used with an agricultural utility vehicle which, for example, tows an agricultural implement. In this case devices are provided, which determine the slippage of the drive wheels and, if the actual slip is different from a specified nominal slip, regulate the drive torque by producing a defined combination of engine speed and gearbox transmission ratio in order to optimize the slip. A disadvantage of the known method and the known device is considered to be that in this regulation process a change of the engine speed also changes the drive torque, so that in some circumstances the power required in order to perform the given work is no longer available.

SUMMARY OF THE INVENTION

Accordingly the purpose of the present invention is to provide a method and a device for implementing the method which, during a working process (above all at low driving speeds of less than 10 km/h), which enable traction forces up to a maximum value that can be reached by virtue of the installed power to be produced, whereas an uncontrolled increase of slippage due to wheel slip of the wheel or wheels is avoided.

The invention is based on the recognition that optimum slip regulation can only be achieved when the speed of the drive wheels can be regulated without influencing the maximum possible drive torque or drive power.

Accordingly, the invention starts from a method for controlling slippage in a tractor vehicle or the like, in which the slip of the drive wheels is determined and, if the actual slip differs from a specified nominal slip, the transmission ratio of an adjustable transmission arranged in the drivetrain is adjusted in the direction appropriate for slip optimization, and a device for implementing the method, with an adjustable transmission arranged in the drivetrain, which comprises means for determining the slip of the drive wheels and means for adjusting the transmission ratio in the direction appropriate for slip optimization.

To achieve the set objective it is provided that the transmission ratio is regulated by means of a geared-neutral process and the transmission is designed as a geared-neutral transmission.

Geared-neutral transmissions are known per se. The characteristic feature of such transmissions is that the gear ratio can be regulated completely independently of the power to be transmitted by the drive wheel to the road, between a maximum drive output speed determined by the design of the transmission and the lowest drive output speeds, if necessary even down to a drive output speed equal to zero (and if needs be, even an opposite drive output direction). Accordingly, this enables the task typical for tractor vehicles of the type defined above, namely at low driving speeds (such as <10 km/h) to apply traction or thrust forces up to the maximum attainable value and at the same time prevent any uncontrolled slip increase resulting from wheel-slip of the driving wheels, to be achieved in an optimum manner.

Geared-neutral transmissions are based on the principle that the transmission input power is branched via a branching gear system and the two power branches are then brought together again by special summation gearing, such that the speed of a first power branch can be varied continuously, for example by means of variator gearing, in such manner that the sum of the speeds of the two power branches, i.e. the output speed, assumes an extremely small value (if necessary down to zero and even a rotation direction reversal). The summation gearing is formed, for example, by a planetary transmission whose carrier is connected to one power branch, whose sun gear is connected to the other power branch, and whose output is connected to the ring gear.

By virtue of the geared-neutral transmission a method and device of the type of the invention enable accurate adjustment of extremely low drive output and hence drive wheel rotation speeds regardless of the drive output load, i.e. the friction existing between the drive wheels and the road. The drive wheel speed, furthermore, is independent of the available engine power. This prevents undesired wheel-spin of the drive wheels due to a decrease of the friction between the drive wheels and the road, even when there is a high drive output torque on the drive wheels when the vehicle is almost stationary.

In a preferred embodiment of the method according to the invention, it is provided that the drive wheel slip is determined by the simultaneous measurement of the drive wheel rotation speed and the actual speed of the vehicle over the ground, by comparing the values obtained. The drive wheel slip is usually given as a percentage ratio of the slip speed (i.e. the relative speed of a tire profile element over the ground) and the absolute speed of the vehicle. As explained earlier, slip is necessary in order to produce a traction force. The relationship between the slip and the traction force attainable, i.e. the coefficient of friction μ between the drive wheels and the road, is explained in more detail below with reference to a qualitative representation.

According to another feature of the invention the actual driving speed of the vehicle over the ground is determined by means of a radar system or laser system located on the vehicle, or by virtue of reference points outside the vehicle (sender/receiver; satellite-supported GPS position-determining system), as already known per se.

As was explained earlier, the gear ratio is regulated so as to optimize the slip. The optimization objective may differ depending on what is required. In one version of the invention the aim of slip optimization is to maximize the traction force.

Another optimization objective can be to optimize the slip with a view to limiting ground damage to a specified amount.

It may also be appropriate to permit slip within a certain slip range, for example between a point of maximum traction force and a point of maximum ground protection, and regulate the slip so that its values lie within the specified optimum slip range.

One version of the invention provides that it is possible for the driver of the vehicle, by means of an operator system, to select the optimization objective or to specify a maximum permitted slip at the drive wheels.

If the device according to the invention is used, the driver can control the forward movement of the vehicle even at very low driving speeds exclusively by means of a suitable drive pedal or the like which, for example, controls the variator mentioned earlier, so that there is no need for him to control the drive output torque for example by means of a clutch pedal or by specifying an engine speed corresponding, for example, to a speed difference at a hydraulic converter. In addition there is no need to recognize and control the drive wheel slip by observing the movement relative to the road surface. This is particularly advantageous when the surface condition is varying.

Basically, monitoring and regulation of the slip in accordance with the present invention are also possible at higher driving speeds using the same principle. However, the aim of the invention relates to application at low speeds, since it is then that the advantages of the geared-neutral transmission can be used to best effect by exact adjustment of the drive output speeds. Compared, however, to conventional drivetrains with clutches, integrated hydraulic converters or hydrostatic drives, in the sense of the objective set here there are distinct advantages in controlling the drivetrain in the lower speed range of a vehicle.

BRIEF DESCRIPTION OF THE DRAWINGS

The invention can be explained more precisely with reference to the attached drawing, which shows.

DETAILED DESCRIPTION OF THE PREFERRED EMBODIMENTS

Figure 1:
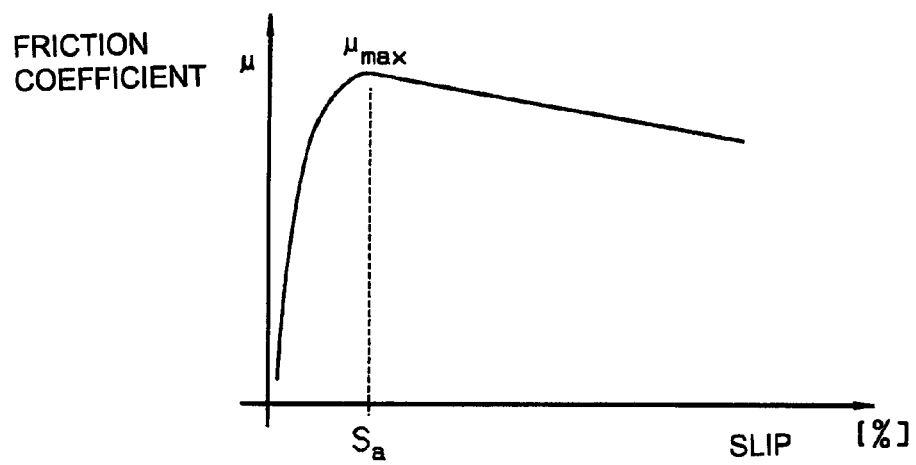
FIG. 1: Qualitative representation of a friction coefficient/slip diagram.

FIG. 1 shows the variation of the coefficient of friction μ as a function of slip which, as already mentioned, is expressed as a percentage ratio of the slip speed and the absolute speed of the vehicle. The friction coefficient μ is the ratio of the propelling force $F_x$ transmitted by the drive wheel to the normal force $F_n$ acting on the drive wheel, as is generally known. As shown in FIG. 1, with increasing slip the friction coefficient μ at first rises steeply, reaches its maximum value $\mu_{max}$ at a certain slip $S_a$, and thereafter falls relatively slowly. It can be seen that slip is necessary in order to produce a traction force. As a typical example let it be said that with a winter tire the maximum friction coefficient $\mu=\mu_{max}$ is reached at $S_a$~15%, where on a dry road μ~1 and on a wet road μ~0.6.

Figure 2:
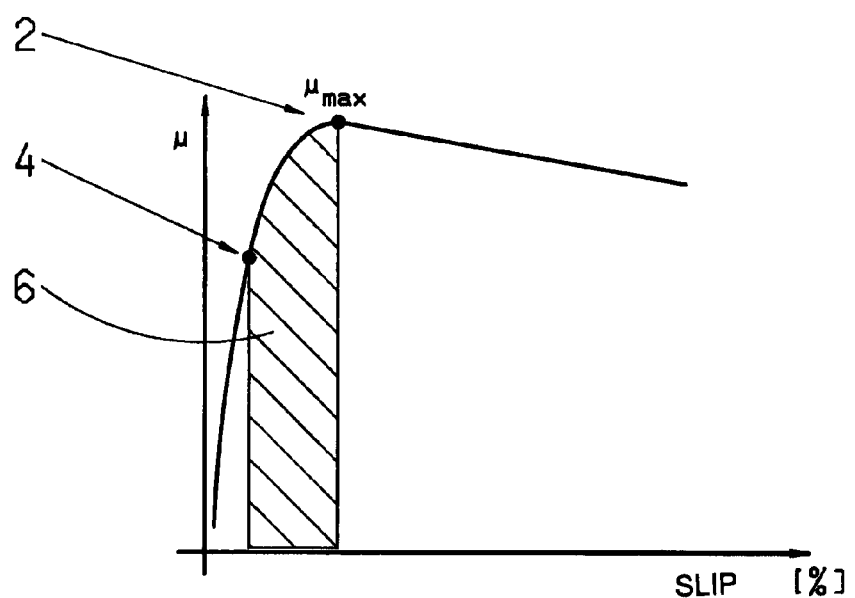
FIG. 2: Diagram corresponding to FIG. 1 in which, in addition, selected slip points and a slip range are indicated as optimization objectives

FIG. 2 shows a representation similar to FIG. 1, in which the operating point 2 represents the maximum traction force and the operating point indicated as 4 represents optimum ground protection with still adequate traction force by limiting the slip at the drive wheel. The shaded area represents an optimized slip range between the operating point 2 of maximum traction force and the operating point 4 of optimum ground protection. Depending on his objective, the driver can choose whether to maintain maximum traction force or optimum ground protection, or whether the slip can be allowed to vary between those values during the working process.

INDEXES

2 Point of maximum traction force
4 Point of optimum ground protection
6 Slip range
μCoefficient of friction
$F_n$ Normal force
$F_x$ Propulsion force
$S_a$ Slip at maximum coefficient of friction

The invention claimed is:

1. A method for controlling slip of a tractor vehicle in which drive wheel slip is determined, the drive wheel slip being determined by simultaneous measuring a drive wheel rotational speed and an actual driving speed of the vehicle over ground and comparing the measured values and, if the actual slip is different from a specified nominal slip, a gear ratio of a controllable transmission in the drivetrain is adjusted in a direction of slip optimization, and the optimization objective being selected by a driver of the vehicle, the method comprising the steps of:

regulating the gear ratio such that the drive wheel rotation speed is controlled by adjusting the gear ratio by a geared-neutral process in which a transmission input power branches into first and second power branches, via a branching transmission, and the first and the second power branches are brought together again by a summation gearing such that a speed of the first power branch is varied continuously; and changing a sum of the speeds of the first and the second power branches, which essentially equals an output speed on which the speed of the drive wheel depends; and selecting the optimization objective from either a slip optimization in a sense of maximum traction force, a slip optimization in a sense of a specified ground protection, or adjustment of the slip to values in a range between a point of maximum traction force and a point of maximum ground protection.

2. The method according to claim 1, further comprising the step of determining the actual driving speed over the ground by at least one of a radar system, a laser system arranged in the vehicle and by reference points outside the vehicle (sender/receiver; navigation system; GPS).

3. The method according to claim 1, further comprising the step of adjusting the slip within a slip range (6) between respective specified lower and upper slip values.

4. A method for controlling the slip of a tractor vehicle, the method comprising the steps of:
- determining drive wheel slip by simultaneous measuring a drive wheel rotational speed and an actual driving speed of the vehicle over ground;
- comparing measured values of the drive wheel rotational speed and the actual driving speed of the vehicle over ground;
- enabling a driver of the tractor vehicle to select one objective of maximizing traction force, limiting ground damage, and combining maximizing traction force and the limiting ground damage; and
- adjusting gear ratios of a controllable transmission, located along a drive train of the tractor vehicle if the actual slip is different from a specified nominal slip, to optimize the selected objective by a geared-neutral process in which transmission input power is split, via a branching transmission, into first and second power branches and the first and the second power branches are summed via a summation gearing such that a speed of the first power branch is varied continuously and a sum of speeds of the first and the second power branches changes.

* * * * *